(12) United States Patent
Tanaka et al.

(10) Patent No.: US 8,027,228 B2
(45) Date of Patent: Sep. 27, 2011

(54) OPTICAL DISK DEVICE AND SEEK METHOD IN OPTICAL DISK DEVICE

(75) Inventors: Masashi Tanaka, Iruma (JP); Hideki Kubo, Tokorozawa (JP)

(73) Assignee: TEAC Corporation, Tama-shi, Tokyo (JP)

( * ) Notice: Subject to any disclaimer, the term of this patent is extended or adjusted under 35 U.S.C. 154(b) by 823 days.

(21) Appl. No.: 11/248,076

(22) Filed: Oct. 12, 2005

(65) Prior Publication Data

US 2006/0083125 A1    Apr. 20, 2006

(30) Foreign Application Priority Data

Oct. 15, 2004    (JP) .................................. 2004-301128

(51) Int. Cl.
G11B 7/085    (2006.01)
(52) U.S. Cl. .................. 369/44.28; 369/53.28; 369/30.1
(58) Field of Classification Search .................. 369/30.1, 369/44.28, 44.32, 53.28, 44.26, 44.34; 360/78.14
See application file for complete search history.

(56) References Cited

U.S. PATENT DOCUMENTS

| 5,285,431 | A |   | 2/1994  | Ogawa |
| 5,343,453 | A |   | 8/1994  | Ogino |
| 5,371,724 | A | * | 12/1994 | Uno ............................. 360/78.14 |
| 5,959,947 | A | * | 9/1999  | Inoue et al. .................. 369/30.1 |

FOREIGN PATENT DOCUMENTS

| JP | 64-4986 A     | 1/1989 |
| JP | 2-149992 A    | 6/1990 |
| JP | 6-150341 A    | 5/1994 |
| JP | 11-161966 A   | 6/1999 |
| JP | 2001-256656   | 9/2001 |

OTHER PUBLICATIONS

Notice of Grounds for Rejection (JP) mailed Apr. 7, 2009, issued in corresponding Japanese Application No. 2004-301128.
Notice of Grounds for Rejection (JP) mailed Jul. 28, 2009, issued in corresponding Japanese Application No. 2004-301128, filed Oct. 15, 2004.

* cited by examiner

*Primary Examiner* — Will J Klimowicz
*Assistant Examiner* — Kim-Kwok Chu
(74) *Attorney, Agent, or Firm* — Seed IP Law Group PLLC (57) ABSTRACT

An optical disk device executes a seek operation to move an irradiation position of light beam on an optical disk to a track of a target address. During execution of a seek operation through a one-track jump operation in which the irradiation position of the light beam is moved along the radial direction of the optical disk by one track, it is determined whether or not off-track of the irradiation position of the light beam has occurred. When it is determined that the off-track has occurred, a seek operation through a multiple track jump operation is executed in which the irradiation position of the light beam is moved along the radial direction of the optical disk by an amount corresponding to a plurality of tracks.

8 Claims, 6 Drawing Sheets

OPTICAL DISK DEVICE AND SEEK METHOD IN OPTICAL DISK DEVICE

BACKGROUND OF THE INVENTION

1. Field of the Invention

The present invention relates to an optical disk device and a seek method in an optical disk device, and in particular, to an optical disk device which performs a seek operation to move an irradiation position of a light beam on an optical disk to a track in which a target address is present, and a seek method therein.

2. Description of the Related Art

In an optical disk device, a seek operation is performed in which an irradiation position of laser light on an optical disk (light spot position) is moved to a track of a target address (refer to, for example, Japanese Patent Laid-Open Publication No. 2001-256656). In general, in the seek operation, a macro-seek operation in which the irradiation position of the laser light is moved in a wide range along the radial direction of the optical disk is executed. Then, a multiple track jump (N-track jump) is executed in which the irradiation position of laser light is moved along the radial direction of the optical disk by an amount corresponding to a plurality of tracks. Finally, a one-track jump is executed in which the irradiation position of the laser light is moved by one track along the radial direction of the optical disk. In the one-track jump which is performed as the last step, a tracing process is performed every time the irradiation position of the laser light is moved by one track in order to improve the precision of the track jump.

In a seek operation through one-track jump, however, it may become difficult for the light spot to reach the track of the target address for the following reason, for example. When the light spot passes over an area having different reflectivities between adjacent tracks, such as a boundary between a recorded region and an unrecorded region, the balance of the reflection light detected by an optical detector for generating a tracking error signal may be disturbed and off-track of the light spot tends to occur more frequently. When an off-track occurs, the seek operation through one-track jump is again executed toward the track of the target address, but the off-track again occurs when the light spot passes over the area at which the off-track occurred. In this case, it is difficult for the light spot to reach the track of the target address, and, consequently, to quickly and stably perform the seek operation. Such a problem is not limited to a case in which the light spot passes over a boundary between a recorded region and an unrecorded region, and may occur, for example, when the light spot passes over a scratch on a surface of the optical disk.

In the related art of Japanese Patent Laid-Open Publication No. 2001-256656, regarding an optical disk having a boundary region, in which the position information cannot be replayed, between a plurality of data regions, an access over the boundary region is performed through a first jump operation for jumping within the data region and a second jump operation for jumping over the boundary region between the data regions. In this art, however, when the area in which the off-track occurs is not identified, the jump operation for not repeating the off-track is difficult, and moreover, no method for identifying the area in which the off-track occurs is disclosed in this reference.

SUMMARY OF THE INVENTION

The present invention advantageously provides an optical disk device in which the seek operation can be quickly and stably performed, and a seek method therein.

According to the present invention, an optical disk device performs a seek operation to move an irradiation position of light beam to a track of a target address on an optical disk. According to one aspect of the present invention, there is provided an optical disk device comprising a seek controller which can execute, during execution of the seek operation, a multiple track jump operation in which the irradiation position of the light beam is moved along a radial direction of an optical disk by an amount corresponding to a plurality of tracks and a one-track jump operation in which the irradiation position of the light beam is moved along the radial direction of the optical disk by one track, and a off-track determination unit which determines an off-track of the irradiation position of the light beam. The seek controller executes the seek operation through the multiple track jump operation when the off-track determination unit determines that the off-track has occurred during execution of the seek operation through the one-track jump operation.

According to another aspect of the present invention, it is preferable that the optical disk device further comprises an address detector which detects an address at an irradiation position of a light beam on an optical disk based on light reflected from the optical disk. During execution of the seek operation through the one-track jump operation, the address detector detects an address at the irradiation position of the light beam every time the irradiation position of the light beam moves between the tracks, and the off-track determination unit identifies the address in which off-track occurs based on the detected address when the off-track determination unit determines that the off-track has occurred. The seek controller prohibits execution of the seek operation through the one-track jump operation when the light spot passes over the track of an address identified by the off-track determination unit.

According to another aspect of the present invention, there is provided a seek method in an optical disk device wherein off-track of an irradiation position of a light beam is determined during execution of a seek operation through a one-track jump operation in which the irradiation position of the light beam is moved along a radial direction of an optical disk by one track, and when it is determined that the off-track has occurred, a seek operation through a multiple track jump operation is executed in which the irradiation position of the light beam is moved along the radial direction of the optical disk by an amount corresponding to a plurality of tracks.

According to the present invention, a suitable track jump method can be selected based on the occurrence situation of the off-track during the seek operation, and therefore, the seek operation can be quickly and stably performed.

BRIEF DESCRIPTION OF THE DRAWINGS

A preferred embodiment of the present invention will be described in detail with reference to the drawings, wherein.

DESCRIPTION OF THE PREFERRED EMBODIMENT

A preferred embodiment of the present invention (hereinafter simply referred to as "embodiment") will now be described.

Figure 1:
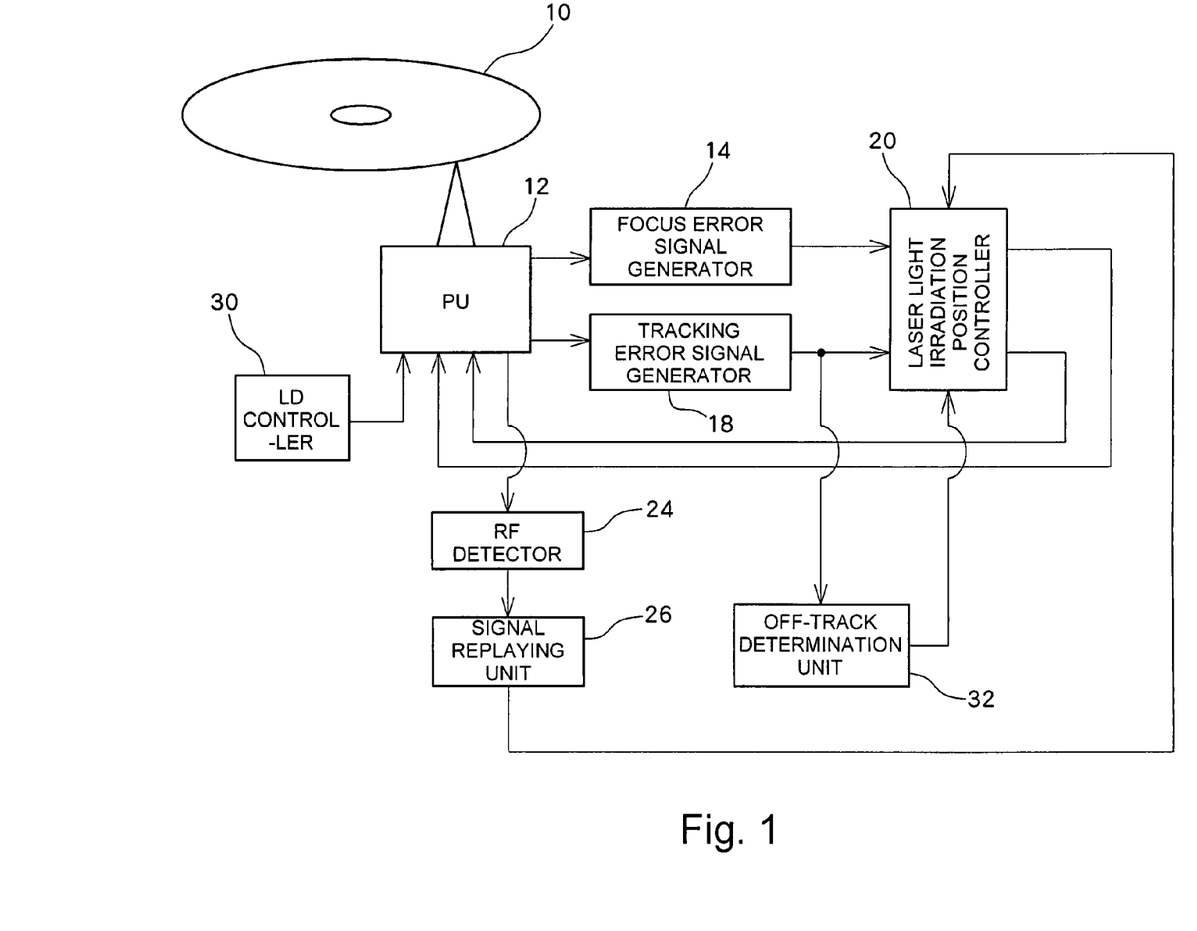
FIG. 1 is a block diagram schematically showing a structure of an optical disk device according to a preferred embodiment of the present invention.

FIG. 1 is a block diagram schematically showing a structure of an optical disk device according to a preferred embodiment of the present invention. An optical disk 10 such as a DVD-R and a DVD-RW is rotated and driven by a spindle motor (not shown). An optical pickup device (PU) 12 is placed opposing the optical disk 10 and comprises a laser diode (LD) which irradiates laser light on a surface of the optical disk 10 as a light beam, and an optical detector which detects light reflected from the optical disk 10 and converts the detected light into an electrical signal.

A focus error signal generator 14 generates and outputs a focus error signal based on the reflection light (electrical signal) detected by the optical detector in the optical pickup device 12. A tracking error signal generator 18 generates and outputs a tracking error signal based on the reflection light (electrical signal) detected by the optical detector in the optical pickup device 12. In this structure, for example, a tracking error signal can be generated through a phase difference method or a push-pull method using one beam.

A laser light irradiation position controller 20 controls the irradiation position of the laser light on the optical disk 10 (light spot position). More specifically, the laser light irradiation position controller 20 controls the optical pickup device 12 to drive the optical pickup device 12 along a focus direction based on the focus error signal from the focus error signal generator 14, to perform a focus servo control. The laser light irradiation position controller 20 drives the optical pickup device 12 along the radial direction (track direction) of the optical disk 10 to control the position of the light spot along the radial direction of the optical disk 10 so that the level of the tracking error signal from the tracking error signal generator 18 is minimized. In this manner, the tracking servo control is performed to prevent off-track of the light spot position.

When the laser light irradiation position controller 20 performs a seek operation, the laser light irradiation position controller 20 applies a control process to move the irradiation position of the laser light (light spot position) on the optical disk 10 to a track corresponding to a target address. The laser light irradiation position controller 20 can selectively execute, during execution of the seek operation, a macro-seek operation in which the irradiation position of the laser light is moved in a wide range along the radial direction of the optical disk 10, a multiple track jump operation (N-track jump operation) in which the irradiation position of the laser light is moved along the radial direction of the optical disk 10 by an amount corresponding to a plurality of tracks, and a one-track jump operation in which the irradiation position of the laser light is moved along the radial direction of the optical disk 10 by one track.

An RF detector 24 amplifies the electrical signal detected by the optical detector in the optical pickup device 12 to generate a replay RF signal, applies a filtering process and an equalizing process, and outputs to a signal replaying unit 26. The signal replaying unit 26 AC-couples an input signal from the RF detector 24, binarizes the AC-coupled input signal using a threshold voltage, demodulates the binarized signal, and outputs demodulated data. The address information at the irradiation position of the laser light on the optical disk 10 can be detected by the RF detector 24 and the signal replaying unit 26 based on the electrical signal detected by the optical detector in the optical pickup 12. For example, when the optical disk 10 is a DVD-R, the address information can be derived using a Land Pre-Pit (LPP) method and, when the optical disk 10 is a DVD+R, the address information can be derived through a high frequency wobble groove (ADIP) method.

An LD controller 30 controls emission power of the laser diode in the optical pickup device 12. The emission power of the laser light by the laser diode is suitably set corresponding to the recording or replaying process of the optical disk 10.

An off-track determination unit 32 determines off-track of the irradiation position of the laser light (light spot position). In this configuration, the off-track can be determined, for example, based on the tracking error signal from the tracking error signal generator 18.

A seek operation in the optical disk device according to the present embodiment will now be described referring to a flowchart of FIG. 2.

In step S100, address information at the irradiation position of the laser light on the optical disk 10 is detected by the signal replaying unit 26 so that the address of a position where the light spot is currently placed is confirmed. Then, the process proceeds to step S101, where a seek span is calculated based on a difference between a target address and the current address detected in step S100 and a seek method is determined by the laser light irradiation position controller 20 based on the calculation result. When the macro-seek operation is to be employed as the seek method, the process proceeds to step S102, when the multiple track jump operation is to be employed as the seek method, the process proceeds to step S105, and when the one-track jump operation is to be employed as the seek method, the process proceeds to step S108.

In step S102, the laser light irradiation position controller 20 executes the macro-seek operation in which the light spot is moved in a wide range along the radial direction of the optical disk 10. In this configuration, a distance of movement of the light spot is controlled based on a difference between the target address and the current address detected by the signal replaying unit 26. Then, the process proceeds to step S103 wherein the address information of the irradiation position of the laser light after the macro-seek operation is detected by the signal replaying unit 26.

In step S104, the laser light irradiation position controller 20 determines whether nor not the macro-seek operation should be repeated. In this configuration, repetition of the macro-seek operation is determined as being necessary when a difference between the target address and the current address detected in step S103 is greater than a predetermined value x1 and is determined as being not necessary when the difference in addresses is less than or equal to the predetermined value x1. When it is determined in step S104 that the macro-seek operation should be repeated, the process jumps back to step S102 and the processes of steps S102 and S103 are repeated. When, on the other hand, it is determined in step S104 that the macro-seek operation does not need to be repeated, the process proceeds to step S105.

In step S105, the laser light irradiation position controller 20 executes a multiple track jump operation (N-track jump operation) in which the irradiation position of the laser light is moved along the radial direction of the optical disk 10 by an amount corresponding to a plurality of tracks. In this configuration, a number of tracks of movement for the light spot is controlled based on the difference between the target address and the current address detected by the signal replaying unit 26. During execution of the multiple track jump operation, the track servo control using the tracking error signal is switched off (that is, the control is not performed). Then, the process proceeds to step S106 where address information of the irradiation position of the laser light after the multiple track jump operation is detected by the signal replaying unit 26.

Then, in step S107, the laser light irradiation position controller 20 determines whether or not the multiple track jump operation should be repeated. In this configuration, it is determined that the multiple track jump operation should be repeated when the difference between the target address and the current address detected in step S106 is greater than a predetermined value x2 (wherein x2<x1) and that the multiple track jump operation does not need to be repeated when the difference in addresses is less than or equal to the predetermined value x2. When it is determined in step S107 that the multiple track jump operation should be repeated, the process jumps back to step S105 and the processes in steps S105 and S106 are repeated. When, on the other hand, it is determined in step S107 that the multiple track jump operation does not need to be repeated, the process proceeds to step S108.

In step S108, the laser light irradiation position controller 20 executes the one-track jump operation in which the irradiation position of the laser light is moved along the radial direction of the optical disk 10 by one track. During execution of the one-track jump operation, the track servo control is switched on to apply a tracing process of the track every time the irradiation position of the laser light is moved by one track, in order to improve the precision of the track jump. A number of repetitions of the one-track jump operation is set based on a difference between the target address and the address immediately before the one-track jump operation is started, which is detected by the signal replaying unit 26.

Next, in step S109, the off-track determination unit 32 determines whether or not an off-track of the irradiation position of the laser light (light spot position) has occurred. When it is determined in step S109 that no off-track has occurred, the process proceeds to step S110 where the laser light irradiation position controller 20 determines whether or not the number of one-track jumps has reached the set number. When the number of one-track jumps has not reached the set number, the process jumps back to step S108 and the processes of steps S108 and S109 are repeated. When, on the other hand, it is determined that the number of one-track jumps has reached the set number, the process proceeds to step S115.

When it is determined in step S109 that an off-track has occurred, the process proceeds to step S111 where the signal replaying unit 26 detects the address information of the current irradiation position of the laser light. The process then proceeds to step S112 where the laser light irradiation position controller 20 executes the multiple track jump operation. In other words, when it is determined that an off-track has occurred during execution of the seek operation through a one-track jump operation, the seek operation is switched from the seek operation through the one-track jump operation to the seek operation through the multiple track jump operation. Here, the number of tracks of movement for the light spot is controlled based on a difference between the target address and a current address detected by the signal replaying unit 26. During the execution of the multiple track jump operation, the track servo control using the tracking error signal is switched off (that is, the track servo control is not performed). Then, the process proceeds to step S113 where the signal replaying unit 26 detects the address information of the irradiation position of the laser light after the multiple track jump operation.

In step S114, the laser light irradiation position controller 20 determines whether or not the multiple track jump operation should be repeated. In this configuration, it is determined that the multiple track jump operation should be repeated when a difference between the target address and the current address detected in step S113 is greater than a predetermined value x3 (wherein x3<x2) and that the multiple track jump operation does not need to be repeated when the difference in addresses is less than or equal to the predetermined value x3. When it is determined that the multiple track jump operation should be repeated, the process jumps back to step S112 and the processes of steps S112 and S113 are repeated. When, on the other hand, it is determined that the multiple track jump operation does not need to be repeated, the process proceeds to step S115.

Instep S115, the signal replaying unit 26 detects information of the target address while the track servo control is switched on to trace the track. Then, the execution of the seek operation is completed.

Figure 3:
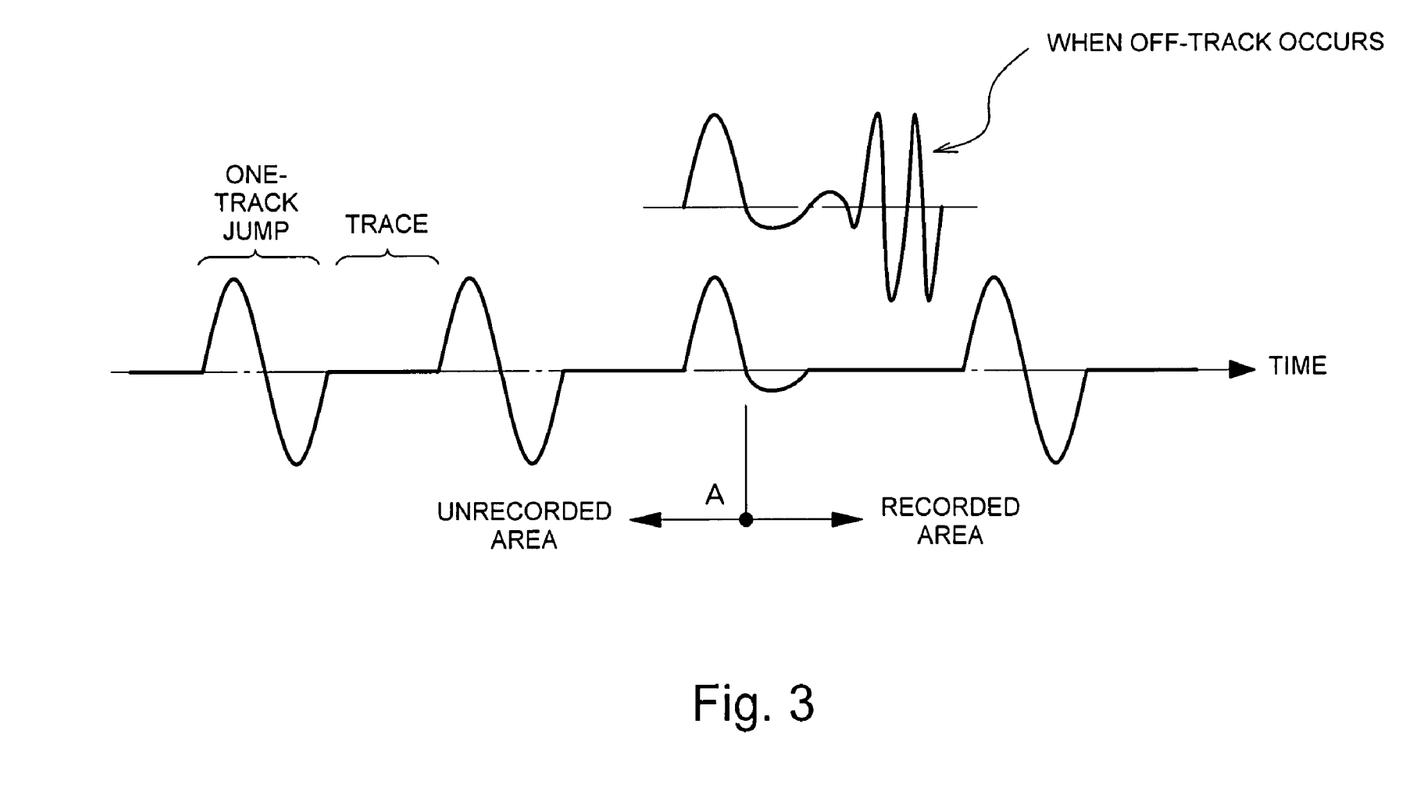
FIG. 3 is a diagram exemplifying a time sequential waveform of a tracking error signal when the light spot passes over a boundary between a recorded region and an unrecorded region by repeating the one-track jump operation and trace process.

Consider a case in which an area having different reflectivities in adjacent tracks such as a boundary between a recorded region and an unrecorded region is passed over by repeating the one-track jump operation and tracing process. In this case, as shown in the time sequential waveform of the tracking error signal on FIG. 3, the balance of the tracking error signal is disturbed when the light spot passes over the area having different reflectivities such as a boundary between a recorded region and an unrecorded region (shown in FIG. 3 by "A"), and thus, off-track of the light spot tends to occur. When off-track occurs and the seek operation by the one-track jump operation is to be executed again, off-track would again occur when the light spot passes over the area A in which the off-track occurred. In this case, it is difficult for the light spot to reach the track of the target address. In particular, when the tracking error signal is generated using the one-beam method, off-track tends to occur because the same phase canceling by a sub-beam cannot be utilized.

Figure 4:
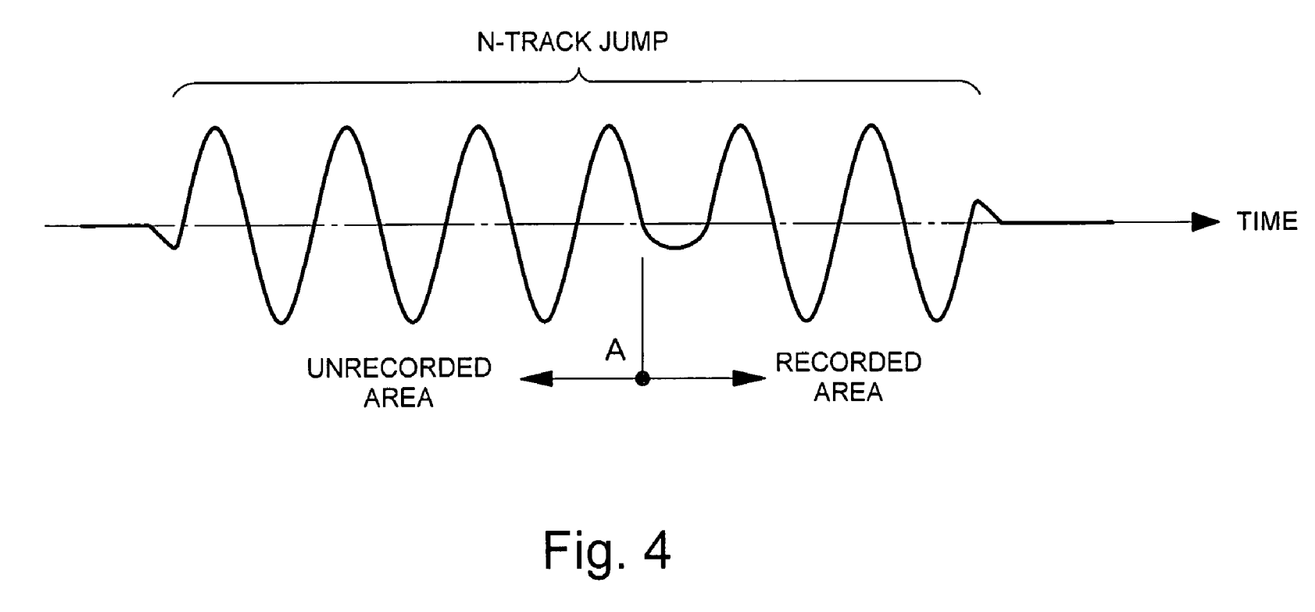
FIG. 4 is a diagram exemplifying a time sequential waveform of a tracking error signal when the light spot passes over a boundary between a recorded region and an unrecorded region by a multiple track jump operation.

In the present embodiment, on the other hand, when it is determined that off-track has occurred during execution of the seek operation through the one-track jump operation, the seek operation through the multiple track jump operation is executed. In this manner, the track jump operation is performed skipping over the area A in which off-track has occurred, as shown in the time sequential waveform of the tracking error signal of FIG. 4. Therefore, it is possible to prevent occurrence of the off-track while the light spot attempts to pass over the area A in which off-track has occurred. In general, the precision of the track jump through the multiple track jump operation is inferior to that of the one-track jump operation. However, by repeatedly executing the multiple track jump operation, it is possible to reliably reach the track of the target address without occurrence of the off-track. When, on the other hand, there is no off-track, it is possible to accurately reach the target address through the one-track jump operation.

In this manner, in the present embodiment, a suitable track jump method can be selected according to the occurrence situation of the off-track during the seek operation, and thus, the seek operation can be quickly and stably performed. For example, when the optical disk is a DVD-RW media, the data read time of a lead-in area which is read during startup can be reduced due to reduction in seek time, and thus, the startup time can be reduced.

Alternatively, it is also possible to execute a seek operation through the multiple track jump operation when off-track occurs a plurality of times (for example, 2 times) during execution of the seek operation through the one-track jump operation in the seek operation described above. In another alternative configuration, it is possible to detect the address information of the current irradiation position of the laser light when it is determined that off-track has occurred during execution of the seek operation through the one-track jump operation and to select the seek operation through a suitable track jump operation based on the detected current address and the target address. For example, when the detected current address does not exceed the target address, seek operation through the multiple track jump operation is executed, and when the detected current address exceeds the target address, seek operation through the one-track jump operation is executed.

During execution of the seek operation through the one-track jump operation, because the signal replaying unit 26 detects the address information at the irradiation position of the laser light every time the irradiation position of the laser light is moved through tracks, the off-track determination unit 32 can determine off-track based on the detected address information, and in addition, can identify the address and the track in which off-track has occurred. For example, when a difference in addresses detected before and after the movement through the tracks is greater than a predetermined value, the off-track determination unit 32 can determine that off-track has occurred and identify the address detected before the track movement and the track of the address as the address and the track in which off-track has occurred.

Figure 5:
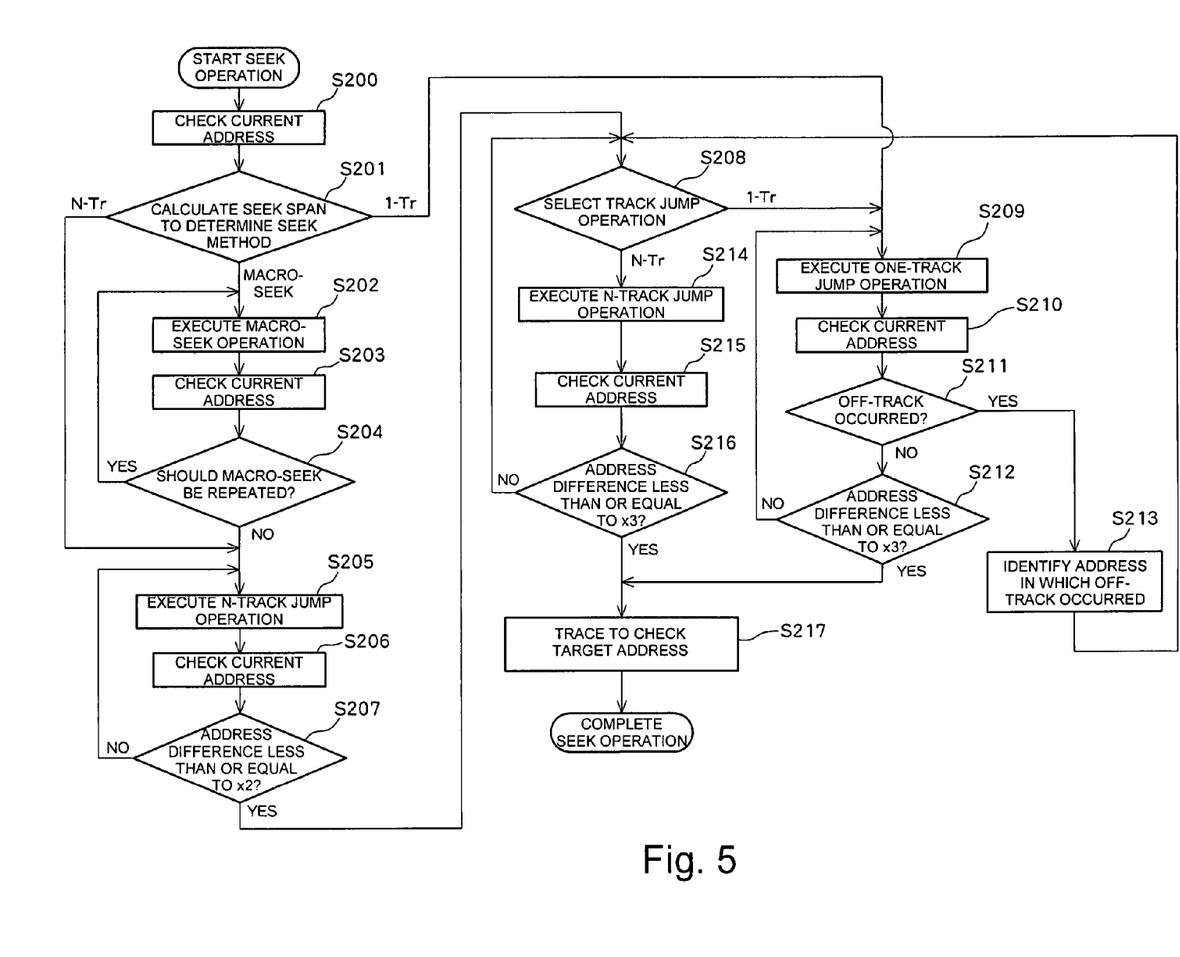
FIG. 5 is a flowchart exemplifying a seek operation in an optical disk device according to a preferred embodiment of the present invention.

A seek operation when the address and track in which the off-track has occurred are to be identified will now be described referring to the flowchart of FIG. 5. The steps S200-S207 of the flowchart of FIG. 5 are identical to steps S100-S107 of the flowchart of FIG. 2.

In step S208, the laser light irradiation position controller 20 selects a seek operation through a suitable track jump operation based on the current address, target address, and an address in which the off-track has occurred. When the one-track jump operation is selected in step S208, the process proceeds to step S209, and when the multiple track jump operation is selected in step S208, the process proceeds to step S214. Details of methods for selecting the suitable track jump operation will be described later.

In step S209, the laser light irradiation position controller 20 executes the one-track jump operation. In this configuration, the track servo control is switched on every time the irradiation position of the laser light is moved by one track to perform tracing of the track. The process then proceeds to step S210 where the signal replaying unit 26 detects the address information of the irradiation position of the laser light after the one-track jump operation.

Then, in step S211, the off-track determination unit 32 determines whether or not off-track has occurred in the irradiation position of the laser light based on the address information detected before and after the one-track jump operation. When the off-track determination unit 32 determines that no off-track has occurred, the process proceeds to step S212 wherein the laser light irradiation position controller 20 determines whether or not a difference between the target address and the current address detected in step S210 is less than or equal to a predetermined value x3. When the address difference is greater than the predetermined value x3, the process jumps back to step S209 and the processes of steps S209-S211 are repeated. When, on the other hand, the address difference is less than or equal to the predetermined value x3, the process proceeds to step S217.

When the off-track determination unit 32 determines that off-track has occurred in step S211, the process proceeds to step S213 and the off-track determination unit 32 detects the address and the track in which the off-track occurred based on the address information detected before and after the one-track jump operation. Then, the process jumps back to step S208.

Figure 2:
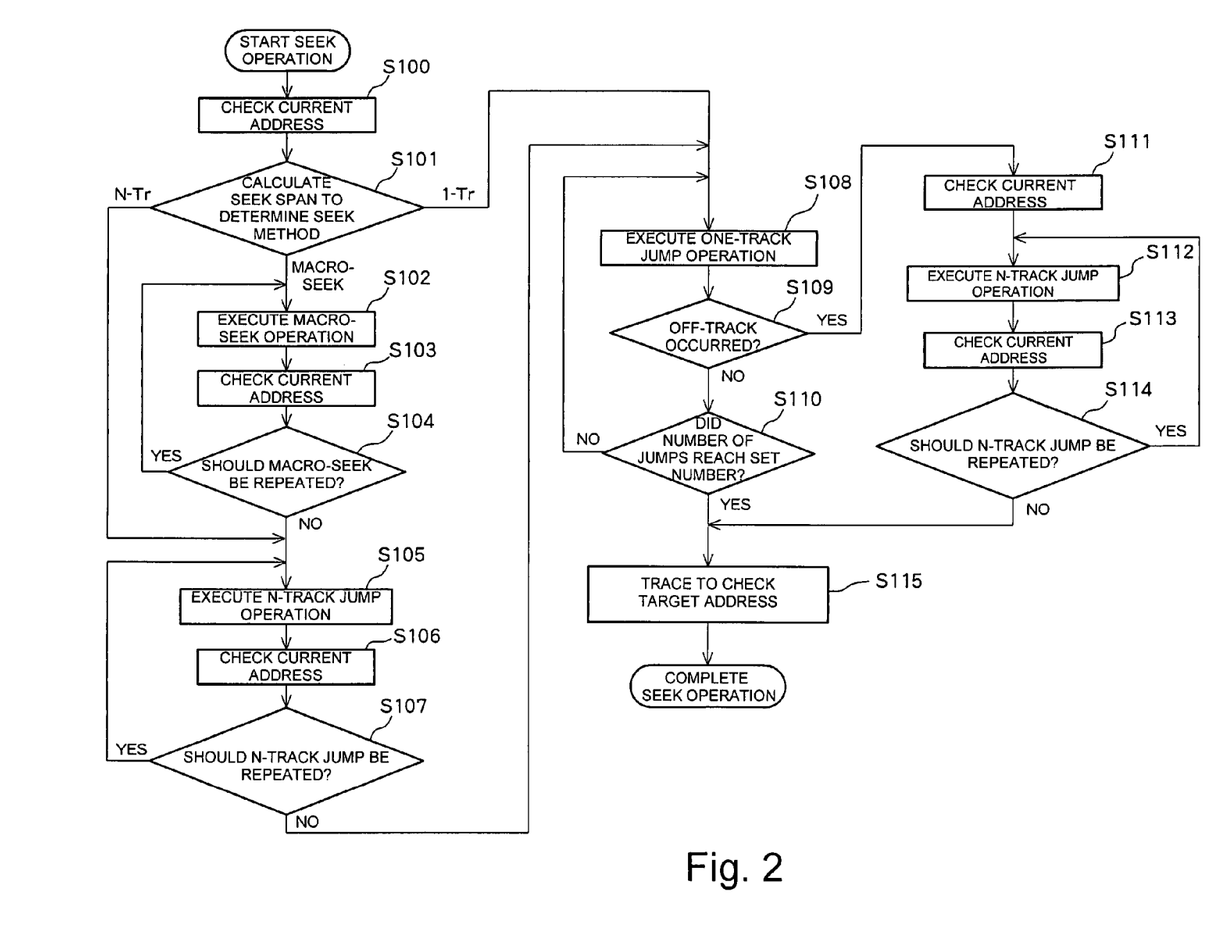
FIG. 2 is a flowchart exemplifying a seek operation in an optical disk device according to a preferred embodiment of the present invention.

In step S214, similar to step S112 in the flowchart of FIG. 2, the laser light irradiation position controller 20 executes the multiple track jump (N-track jump) operation. Then, the process proceeds to step S215 where the signal replaying unit 26 detects address information of the laser light irradiation position after the multiple track jump operation, similar to step S113. Then, in step S216, the laser light irradiation position controller 20 detects whether or not a difference between the target address and the current address detected in step S215 is less than or equal to the predetermined value x3. When the address difference is greater than the predetermined value x3, the process jumps back to step S208. When, on the other hand, the address difference is less than or equal to the predetermined value x3, the process proceeds to step S217.

Similar to step S115, in step S217, the signal replaying unit 26 detects information of the target address while the track servo control is switched on to perform tracing of the track. Then, execution of the seek operation is completed.

A specific example of a selection method of the suitable track jump operation in step S208 will now be described.

As described, when the track of the address in which the off-track has occurred is to be passed over by the one-track jump operation, off-track would occur again. Therefore, it is desirable for the laser light irradiation position controller 20 to prohibit execution of the seek operation through the one-track jump operation when the track of the address in which the off-track has occurred (identified by the off-track determination unit 32) is to be passed over.

Figure 6A:
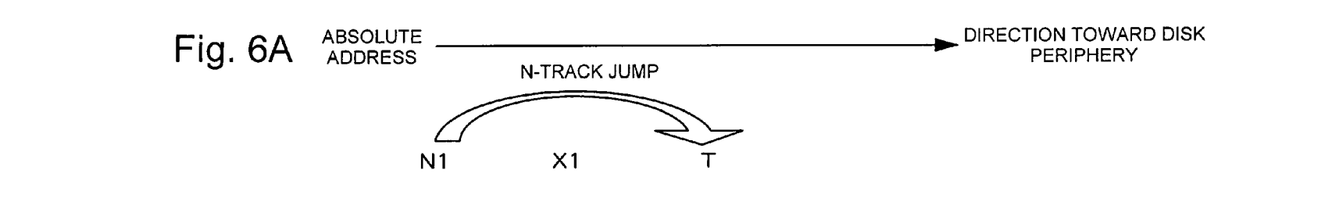
FIG. 6A is a diagram exemplifying a seek operation in an optical disk device according to a preferred embodiment of the present invention.

For example, as shown in FIG. 6A, when there is an address X1 in which off-track has occurred (identified by the off-track determination unit 32) between the address N1 in the current irradiation position of the laser light (light spot position) and the target address T, the laser light irradiation position controller 20 prohibits execution of the seek operation through the one-track jump operation. In such a case, a seek operation through the multiple track jump (N-track jump) operation is executed (process proceeds to step S214). In this manner, occurrence of off-track of the light spot can be prevented.

Figure 6B:
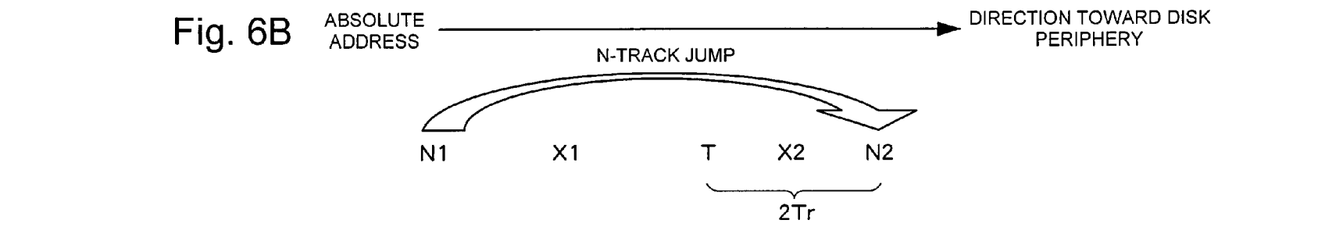
FIG. 6B is a diagram exemplifying a seek operation in an optical disk device according to a preferred embodiment of the present invention.

Because the multiple track jump operation generally has an inferior precision of track jump compared to the one-track jump operation, the irradiation position of the laser light may jump over the target address T by the multiple track jump operation as shown in FIG. 6B. Here, FIG. 6B shows an example case in which the irradiation position jumps over the target address T by two tracks through the multiple track jump operation and there is an address x2 in which off-track has occurred between the address N2 after the jump and the target address T. In this case, execution of the one-track jump operation is prohibited. However, as the irradiation position attempts to jump through the multiple track jump operation over a small number of tracks, such as 2 tracks, the precision of the track jump is significantly reduced.

Figure 6C:
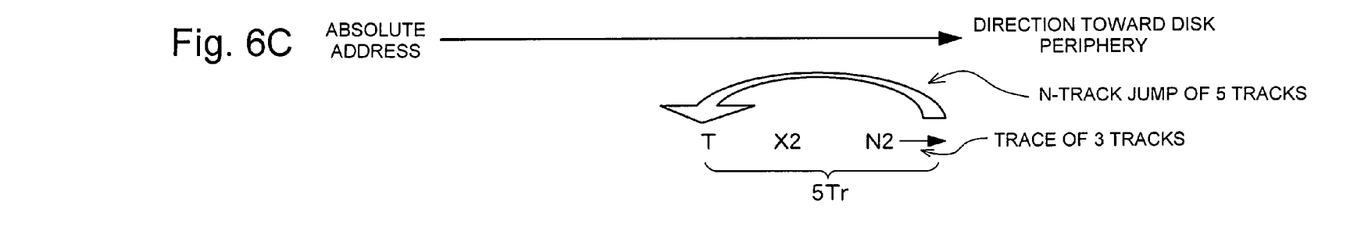
FIG. 6C is a diagram exemplifying a seek operation in an optical disk device according to a preferred embodiment of the present invention.

In this case, as shown in FIG. 6C, the multiple track jump operation is performed after a predetermined number of tracks (for example, 3 tracks) are traced from the address N2 so that the target address T is reached. The precision of the track jump is not reduced in the multiple track jump operation of approximately 5 tracks.

Figure 6D:
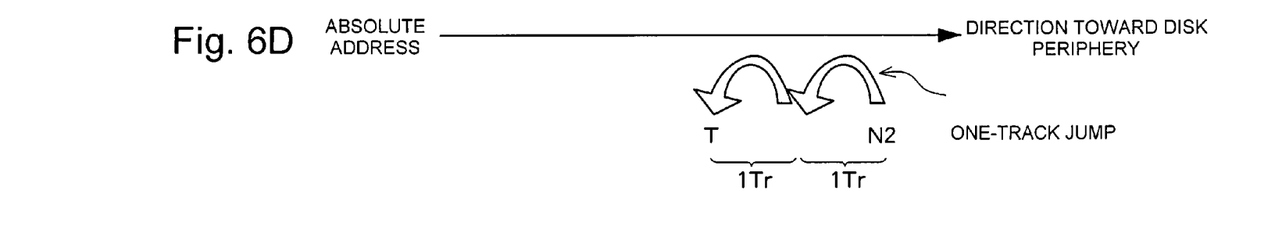
FIG. 6D is a diagram exemplifying a seek operation in an optical disk device according to a preferred embodiment of the present invention.

As shown in FIG. 6D, for example, when there is no address in which off-track has occurred (identified by the off-track determination unit 32) between the address N2 of the current irradiation position of the laser light and the target address T, the laser light irradiation position controller 20 allows execution of the seek operation by the one-track jump operation (process proceeds to step S209). In such a case, it is possible to accurately reach the target address T by repeating the one-track jump operation.

According to this configuration, when off-track occurs during execution of the seek operation by the one-track jump operation, the address in which the off-track has occurred is identified. Because a suitable track jump method can be selected according to the position of the identified address (in which off-track has occurred), the seek operation can be executed quickly and stably.

A preferred embodiment of the present invention has been described. The preferred embodiment, however, should not be construed as limiting the present invention, and various modifications can be made within the scope of the present invention.

What is claimed is:

1. An optical disk device which executes a seek operation to move an irradiation position of a light beam on an optical disk to a track of a target address, the optical disk device comprising:
    an optical pickup configured to irradiate light on the optical disk;
    a position controller coupled to the optical pickup and configured to selectively execute, during execution of the seek operation of the target address, one or more multiple track jump operations in which the position controller controls the optical pickup to move the irradiation position of the light beam along a radial direction of an optical disk by an amount corresponding to a plurality of tracks and one or more one-track jump operations in which the position controller controls the optical pickup to move the irradiation position of the light beam along the radial direction of the optical disk by one track depending on a difference between the target address and a current address of the irradiation position of the light beam; and
    an off-track determination unit which determines an off-track of the irradiation position of the light beam,
    wherein when the position controller selects and executes a one-track jump operation, the off-track determination unit determines whether an off-track has occurred during the execution of the one-track jump operation, and when it is determined that an off-track has occurred during the execution of the one-track jump operation, the position controller executes the seek operation through the one or more multiple track jump operations so as to skip over an area in which off-track has occurred, without execution of the seek operation through the one or more one-track jump operations.

2. An optical disk device according to claim 1, further comprising:
    an address detector which detects an address of the irradiation position of the light beam on the optical disk based on light reflected from the optical disk, wherein
    when the off-track determination unit determines that the off-track has occurred and the one or more multiple track jump operations are executed, the position controller controls a number of tracks of movement during execution of the one or more multiple track jump operations based on an address detected by the address detector and the target address.

3. An optical disk device according to claim 1, wherein
    when the off-track determination unit determines that the off-track has occurred and the one or more multiple track jump operations are executed, the position controller moves the irradiation position of the light beam by an amount corresponding to a plurality of tracks without performing a track servo control using a tracking error signal generated based on light reflected from the optical disk.

4. An optical disk device according to claim 1, further comprising:
    a tracking error signal generator which generates a tracking error signal based on light reflected from the optical disk, wherein
    the off-track determination unit determines whether or not the off-track has occurred based on the tracking error signal generated by the tracking error signal generator during execution of the one-track jump operation.

5. An optical disk device which executes a seek operation to move an irradiation position of a light beam on an optical disk to a track of a target address, the optical disk device comprising:
    an optical pickup configured to irradiate light on the optical disk;
    a position controller coupled to the optical pickup and configured to selectively execute, during execution of the seek operation of the target address, one or more multiple track jump operations in which the position controller controls the optical pickup to move the irradiation position of the light beam along a radial direction of an optical disk by an amount corresponding to a plurality of tracks and one or more one-track jump operations in which the position controller controls the optical pickup to move the irradiation position of the light beam along the radial direction of the optical disk by one track depending on a difference between the target address and a current address of the irradiation position of the light beam;
    an address detector which detects an address of the irradiation position of the light beam on the optical disk based on light reflected from the optical disk; and
    an off-track determination unit which determines an off-track of the irradiation position of the light beam,
    wherein upon execution by the position controller of a seek operation through a one-track jump operation, the off-track determination unit determines whether an off-track has occurred during the execution of the seek operation through the one-track jump operation and the address detector detects the address of the irradiation position of the light beam, and the off-track determination unit identifies the address at which the off-track has occurred based on the detected address, and
    wherein the position controller prohibits the seek operation through a further one-track jump operation and executes the seek operation through at least one multiple track jump operation so as to skip over the address identified by the off-track determination unit as the address at which the off-track has occurred, when the track of the address identified by the off-track determination unit at which the off-track has occurred is to be passed over.

6. An optical disk device according to claim 5, wherein the position controller prohibits execution of the seek operation through a one-track jump operation when the address identified by the off-track determination unit is between the address of the irradiation position of the light beam and the target address.

7. An optical disk device according to claim 5, wherein the position controller allows execution of the seek operation through a one-track jump operation when the address identified by the off-track determination unit is not between the address of the irradiation position of the light beam and the target address.

8. A seek method in an optical disk device for executing a seek operation by controlling an optical pickup so as to move an irradiation position of a light beam on an optical disk to a track of a target address, the method comprising:

executing a seek operation through a one-track jump operation using a position controller so as to move the irradiation position of the light beam along the radial direction of the optical disk by one track;

using an off-track determination unit so as to determine an off-track of the irradiation position of the light beam during execution of the seek operation through the one-track jump operation; and executing a seek operation through a multiple track jump operation using the position controller so as to skip over an area in which the off-track has occurred, without execution of the seek operation through a one-track jump operation, when the off-track determination unit determines that the off-track has occurred during execution of the seek operation through the one-track jump operation.

* * * * *